May 6, 1958 W. W. PRICKETT ET AL 2,833,443
POWDERED MATERIAL DISPENSER
Filed March 22, 1957 3 Sheets-Sheet 1
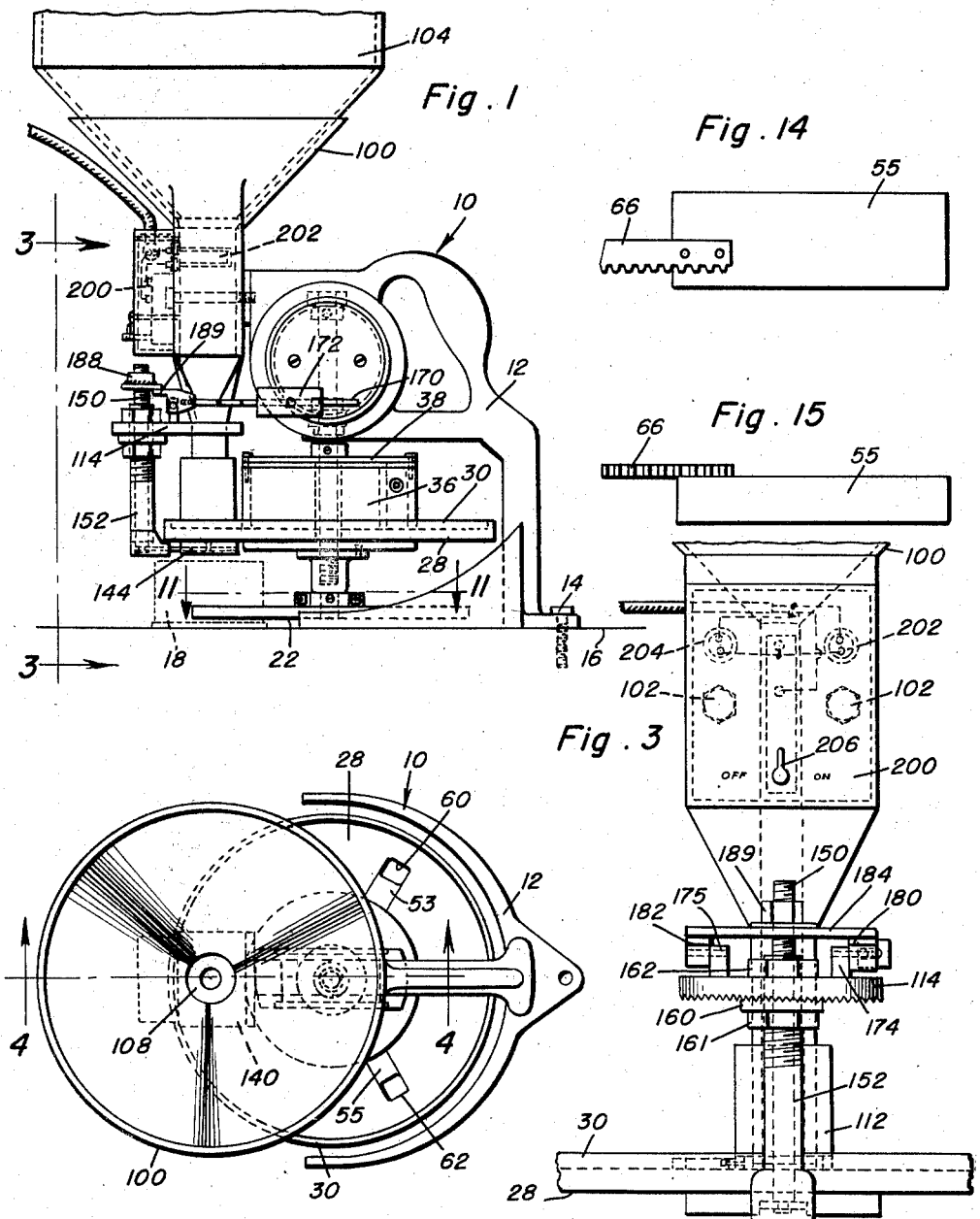
Wilber W. Prickett
Mona E. Prickett
INVENTORS May 6, 1958  W. W. PRICKETT ET AL  2,833,443
POWDERED MATERIAL DISPENSER
Filed March 22, 1957  3 Sheets-Sheet 2
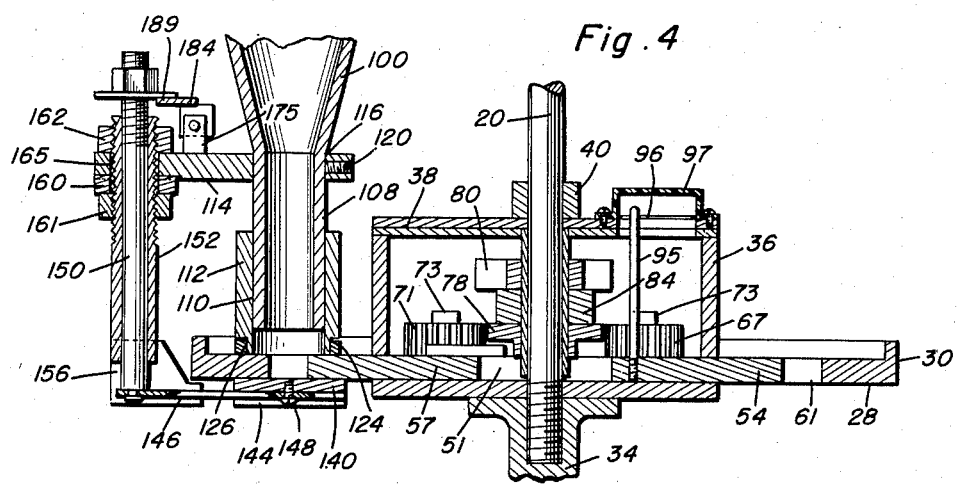
Fig. 4
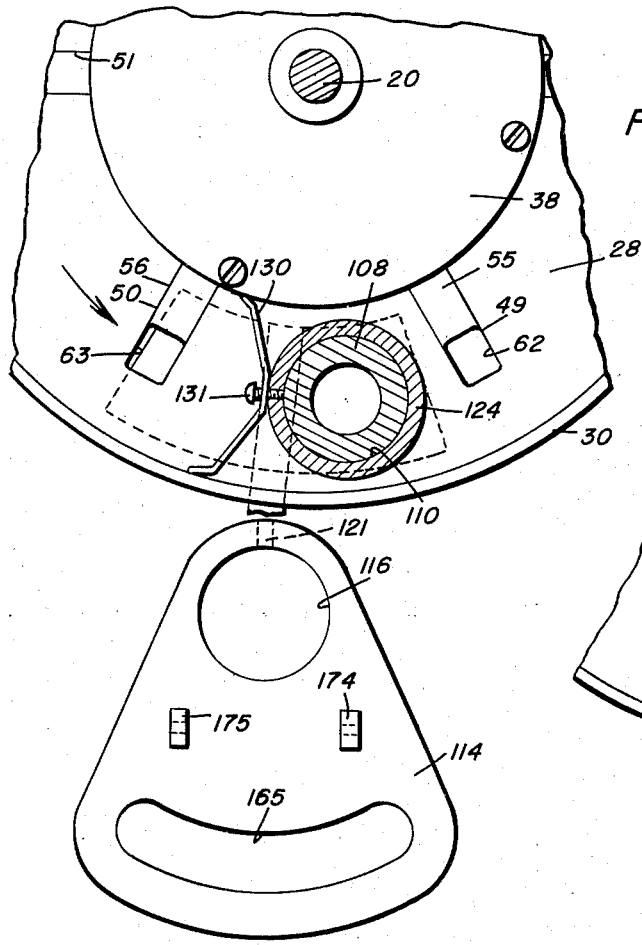
Fig. 5
Fig. 13
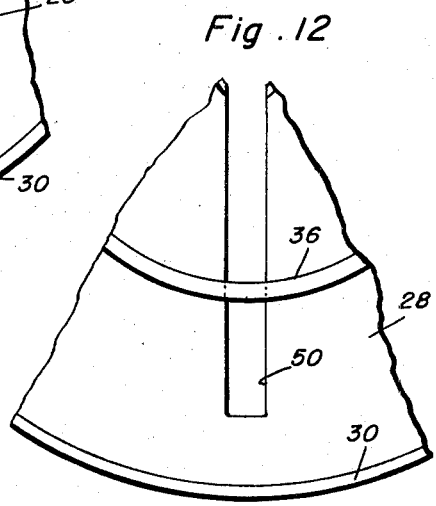
Fig. 12
Wilbert W. Prickett
Mona E. Prickett
INVENTORS May 6, 1958 W. W. PRICKETT ET AL 2,833,443
POWDERED MATERIAL DISPENSER
Filed March 22, 1957 3 Sheets-Sheet 3

Wilber W. Prickett
Mona E. Prickett
INVENTORS

BY *Clarence A. O'Brien*
*and Harvey B. Jacobson*
Attorneys

United States Patent Office 2,833,443
Patented May 6, 1958

2,833,443

POWDERED MATERIAL DISPENSER

Wilber W. Prickett and Mona E. Prickett, San Diego, Calif., assignors to Salter Machine Company, Alameda, Calif., a corporation of California Application March 22, 1957, Serial No. 647,858

11 Claims. (Cl. 222—49)

This invention relates to measuring and dispensing equipment and more particularly to a machine for discharging measured quantities of powdered material into cans, jars or other containers which are propelled in registry with the discharge part of the machine.

An object of the invention is to provide a metering and dispensing machine for powdered material, as seasoning, condiments, salt, etc., the machine being of a novel construction whereby it is actuated in response to the movement of the containers beneath the discharge part of the machine. As the cans are propelled, for example by an endless conveyor, star wheel or other standard conveying device, they move an operating part of our machine setting into motion a train of moving parts which enable one charge of powdered material to be deposited in the container at the precise moment that the container is below the discharge part of the machine. Our machine operates with precision and dependability but yet, is capable of being adjusted in a number of ways to suit various demands.

For example, the size of the charge of each powdered material quantity is variable in accordance with the desires of the user. But, to assure that each charge of material will be the same after adjustment of the machine, all pockets for the material are simultaneously and exactly proportionally adjustable.

We have applied a heater to an effective part of our machine in order to minimize condensation, keeping the material dry and assuring free flow during continual use of the machine, even under adverse humidity conditions.

A further object of the invention is to provide means in a powdered material dispensing machine to assure that what would ordinarily be wasted powdered material, does not become discharged into the containers without first becoming a part of a subsequent charge of material and thereby become measured. Our invention is not especially concerned with the small loss of such material as it is with assuring that the proper size charge of material is applied to the containers and that these charges be absolutely uniform.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is an elevational side view of a machine constructed in accordance with our invention;

Figure 2 is a top view of the machine in Figure 1;

Figure 3 is a front view of the machine in Figure 1, as would be viewed approximately along the plane of line 3—3;

Figure 4 is a sectional view taken on the line 4—4 of Figure 2;

Figure 5 is a horizontal sectional view showing principally the discharge end of the hopper and powdered material scraper;

Figure 12 is a fragmentary top view of the dispensing plate which rotates above the valve plate of Figure 9;

Figure 13 is a top view of a support which constitutes part of our machine;

Figure 14 is a top view of a member which is adjustably mounted in such way as to vary the size of the powdered material dispensing pockets in accordance with the desires of the user; and Figure 15 is an elevational view of the member in Figure 14.

In the accompanying drawings machine 10 is depicted in such a manner as to exemplify the principles of the invention. The machine is made of a frame 12 which may be cast or otherwise formed of one or more parts. However, it is intended that the frame 12 be bolted as at 14 to a supporting surface 16 and in the path of travel of a standard conveyor for cans, jars or other containers which are schematically represented at 18. As the containers are propelled with their open tops, they receive a single charge of powdered material which is dispensed by our machine 10. The timing is such that each container receives but a single charge and within practical limits, the single charge for each can is identical.

Figure 11:
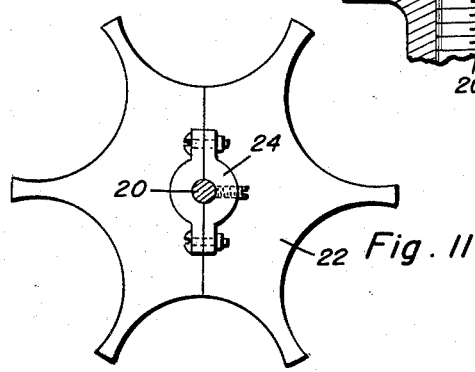
Figure 11 is a sectional view taken on the line 11—11 of Figure 1.
Figure 8:
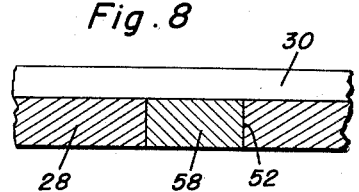
Figure 8 is an enlarged sectional view taken on the line 8—8 of Figure 7.
Figure 7:
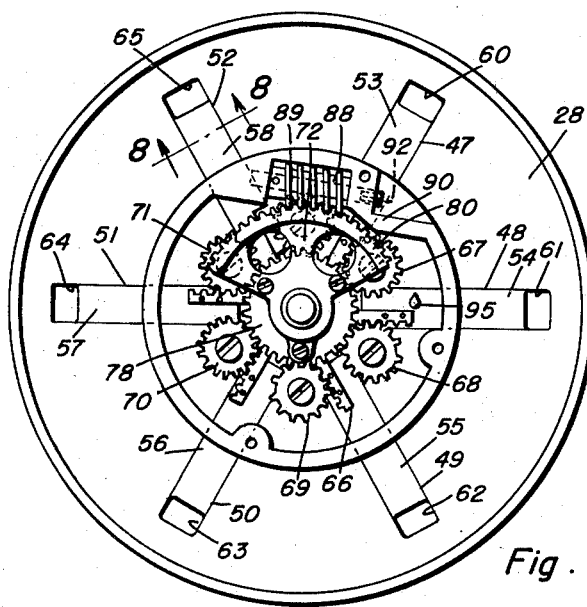
Figure 7 is a top view of the adjusting mechanism for the various members by which the size of charge dispensed by the machine, is regulated.
Figure 9:
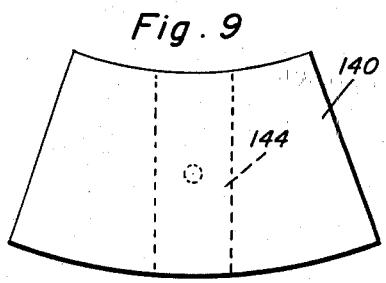
Figure 9 is a top view of the lower valve plate at the discharge part of the machine.

A vertical shaft 20 is mounted for rotation in upper and lower bearings in frame 12. A star wheel 22 is fixed by clamp 24 onto the lower part of shaft 20 (Figure 11) so that as the containers 18 are propelled beneath the discharge part of the machine 10, the containers rotate star wheel 22 in step-by-step fashion. A powdered material metering mechanism 26 (Figure 5) is mounted for rotation with shaft 20 and is concentrically disposed thereon. Metering mechanism 26 is made of a dispensing plate 28, the latter being circular and having an upstanding peripheral rim 30. Flat support 32 is bolted to the bottom surface of dispensing plate 28 and also to hub 34, the latter being attached to a threaded part of shaft 20. Casing 36 rises from the top surface of dispensing plate 28 and has a built up top wall 38 thereon. Shaft 20 is passed through a central hole in the built up top wall 38 and collar 40 is secured to shaft 20 and seats on the built up top wall 38 whose inner surface is recessed as at 42 in order to accommodate sleeve 44 that is concentric with shaft 20.

Figure 6:
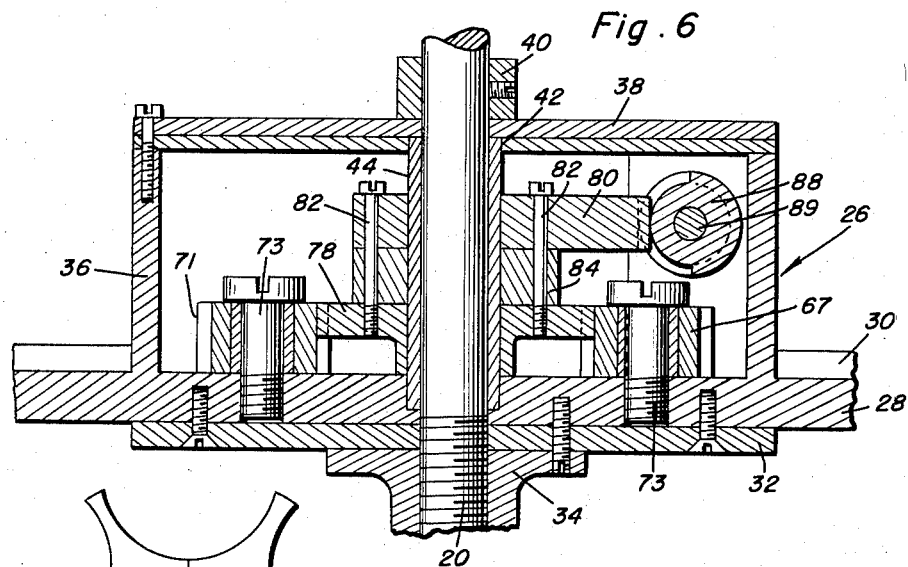
Figure 6 is a sectional view of a part of our machine.

Six radial slots 47, 48, 49, 50, 51 and 52 are formed in the dispensing plate 28 and each slot has its slidable member 53, 54, 55, 56, 57 and 58 disposed therein and filling only a part of its slot thereby leaving powdered material pockets 60, 61, 62, 63, 64 and 65 respectively in the dispensing plate. Each member is in the form of a rectangular plate, Figures 14 and 15, and each has a rack gear, for example gear 66 on member 55, which protrudes from one end thereof and which is secured to its member. The six racks are in mesh with the six pinions 67, 68, 69, 70, 71 and 72 which are mounted for rotation on their spindles 73. Spindles 73 are attached to dispensing plate 28 (Figure 6) and rise from the upper surface thereof. The spindles 73, the racks and pinions are enclosed in casing 36. Spur gear 78 is mounted on sleeve 44 and has attached segment 80 by bolts 82, the latter passing through holes in segment 80, spacer 84 and threaded in tapped holes in gear 78. Worm gear 88 is fixed to a spindle 89, the latter being mounted for rotation in a carrier 90 that rises from the bottom of casing 36. An end of the spindle 89 has a non-circular opening 92 in which a tool is capable of being fitted so as to rotate the spindle and adjust the worm 88. This rotates the gear segment 80 and thereby causes gear 78 to rotate all of the pinions in the same direction an equal distance. The six racks 66 on the members 53, 54, 55, 56, 57 and 58 are moved corresponding distances thereby moving the pocket adjusting members in such direction as to increase or decrease the size of the pockets amounts directly in proportion to the amount of rotation of worm 88. An indicator 95 is attached to member 54 (Figure 4) and is movable to positions registered with the graduations on scale 96 in accordance with the pocket sizes. An inspection window 97 is attached to the top wall 38 of casing 36 and the graduated scale is located therebelow. Indicator 95 is visible through window 97. The graduations may be of any suitable type.

A hopper 100 has bolts 102 connecting it to frame 12. The hopper is adapted to receive container 104 which typifies any size enclosure that will fit in hopper 100 and that has powdered or granulated material to be dispensed. The discharge end or neck 108 of hopper 100 is fitted in the bore 110 of sliding block 112 whose lower surface slides on the upper surface of dispensing plate 28. Bore 110 comes into registry with the pockets in the dispensing plate as plate 28 is rotated. Support 114 has a circular hole 116 near one end through which neck 108 passes. It is held in place by setscrew 120 threaded in hole 121 which registers with hole 116. Collar 124 is fitted in groove 126 at the lower end of sliding block 112. The collar supports scraper 130 whose lower surface rides over the upper surface of dispensing plate 28 during the actuation of the dispensing plate. Bolt 131 attaches the scraper 130 to collar 124 (Figure 5), and the scraper is preferably made of flat stock that is bent to form two divergent arms. The function of the scraper is to prevent accumulation of material by guiding it into the next dispensing pocket to be measured with additional material from the hopper and subsequently dispensed into the next container 18 in the proper train of containers.

Figure 10:
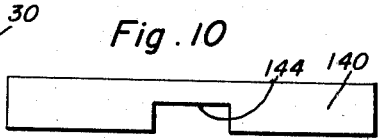
Figure 10 is a front view of the valve plate of Figure 9.

Valve plate 140 is arcuate and fits flush against the bottom surface of dispensing plate 28. A transverse groove 144 is formed in the valve plate (Figure 10) and has a supporting arm 146 nested therein and held in place by a bolt 148. Push rod 150 mounted in sleeve 152, has its lower end fitted with side plates 156 between which arm 146 is located. The arm is attached to the push rod 150 and is vertically movable therewith. Lock washer 160 is on a threaded part of sleeve 152 and fits flush against the bottom surface of support 114. Jamb nuts 161 and 162 on lock washer 160 and the top surface of support 114 respectively, hold the sleeve 152 assembled with support 114. However, the push rod is capable of vertical movement.

There are means operatively connected with the push rod 150 to constantly bias the push rod in an upward direction thereby pressing the valve plate upper surface firmly against lower surface of dispensing plate 28. These means consist of a beam 170 supporting a weight 172, the weight being capable of sliding to selected positions on beam 170 and fixed in place by a setscrew. Ears 174 and 175 rise from the support 114 and have a pivot pin or a pair of trunnions (Figure 3) carried therein by which the depending bearings 180 and 182 are mounted for oscillation. Transverse member 184 to which bearings 180 and 182 are secured, supports the beam 170. Vertically adjustable device, as nut 188, is threaded on push rod 150 and has a washer welded to the lower surface thereof. The force of pivotal beam 170 is transmitted to the push rod by having a bearer 189 which protrudes from member 184, and presses against the bottom surface of the washer that is welded on the adjustable force transmitting device 188.

A housing 200 is attached to the neck 108 of hopper 100 and preferably straddles the same. The housing accommodates electric heaters 202 and 204 which, due to their proximity to the neck of the hopper, keep the hopper warm and prevent clogging which is attributable to moisture condensation. Control switch 206 in circuit with the heaters 202 and 204 is wired electrically for connection to a source of electrical energy whereby manual control of the heaters 202 and 204 is available.

The operation of the powdered material dispensing machine is deemed apparent. After loading the hopper with material that is to be dispensed and setting the container 18 propulsion device into operation, the star wheel 22 is moved 30° with the passage of each container 18. During this movement dispensing plate 28 is also moved 30° and this moves one of the dispensing pockets from above the valve plate 140 to a discharging position over the container 18 in question. At the same time the upper surface of dispensing plate 28 is swept by scraper 130 and a new (the next adjacent) pocket becomes filled with powdered material in preparation for being discharged into the next container 18 in the succession thereof.

When more or less volume for the pockets is considered desirable, the pocket size adjusting members are moved by the gearing described previously. In order to reverse the direction of container 18 travel, the valve plate 140 is adjusted to a new position. This is accomplished by loosening nuts 161 and 162 and moving push rod 150 together with its sleeve 152 to the opposite end of slot 165. Slot 165 is formed in support 114 and is located between the lock washer 160 and nut 162. The lock washer takes effect by being serrated (Figure 3) and fitting within the serrated lower surface of support 114. In addition, scraper 130 together with its supporting collar 124 are rotated 180° (approximately) on the neck 108 of hopper 100. By this alteration the scraping of the top surface of the dispensing plate 128 in the proper direction is obtained.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A measuring and dispensing machine for fluent material comprising a frame, a dispensing plate mounted for rotation on said frame, said dispensing plate having a plurality of slots, pocket forming members movably mounted in said slots, means rotatable with said dispensing plate for simultaneously and equally adjusting said members in said slots in order to alter the sizes of said pockets, a fluent material hopper, said hopper carried by said frame and in super position to said dispensing plate, a sliding block on the upper surface of said dispensing plate and in registry with said hopper, and a valve plate slidable against the undersurface of said dispensing plate.

2. The machine of claim 1 wherein there are means connected to said valve plate for constantly applying a yielding force to said valve plate in such direction as to press said valve plate against the lower surface of said dispensing plate.

3. The machine of claim 1 wherein there are means for adjusting the position of said valve plate beneath said dispensing plate in order to relocate said valve plate to enable said dispensing plate to be operated in opposite directions.

4. The machine of claim 3 wherein there is a scraper disposed on the upper surface of said dispensing plate, and means adjustably mounting said scraper on said sliding block so that said scraper may be relocated to selected positions to enable said dispensing plate to be scraped when it is rotated in a clockwise or a counterclockwise direction.

5. The machine of claim 4 wherein said dispensing plate has a rim rising from the periphery thereof.

6. The machine of claim 1 wherein there is a heater located in heat exchange relationship to said hopper in order to minimize moisture condensation in the hopper.

7. In a dispensing machine for powdered material, the combination of a dispensing plate having pockets, means mounting said dispensing plate for rotation on said frame, means propelled by moving containers in which the material is to be deposited, for rotating said dispensing plate, said dispensing plate having material pockets therein, a hopper having a neck in registry with said pockets, means scraping the upper surface of said dispensing plate while filling said pockets from said hopper, and a valve plate located beneath said dispensing plate.

8. In a dispensing machine for powdered material, the combination of a dispensing plate having pockets, means mounting said dispensing plate for rotation on said frame, means propelled by moving containers in which the material is to be deposited, for rotating said dispensing plate, said dispensing plate having material pockets therein, a hopper having a neck in registry with said pockets, means scraping the upper surface of said dispensing plate while filling said pockets from said hopper, a valve plate located beneath said dispensing plate, and means for selectively adjusting the position of said valve plate by shifting the same in a plane parallel to the plane within which said dispensing plate is rotatable.

9. The machine of claim 8 wherein there are means for constantly pressing said valve plate against the bottom surface of said dispensing plate.

10. The combination of claim 8 wherein there are means for adjusting the size of each pocket in said dispensing plate, said pocket size adjusting means being simultaneously movable and movable in precise proportion so as to adjust each pocket to substantially exact dimensions and enable the discharge of the constant quantity of material from each pocket.

11. The combination of claim 10 wherein there is an indicator operatively connected with said pocket size adjusting means.

No references cited.